United States Patent
Tsai et al.

(10) Patent No.: US 6,772,660 B2
(45) Date of Patent: Aug. 10, 2004

(54) MEANS FOR DIRECTLY COUPLING MAIN MOTOR SHAFT TO WORKING MACHINE

(75) Inventors: Chui-Hsi Tsai, Taichung Hsien (TW); Shing-Jye Hwang, Taichung (TW); Yi-Tang Chen, Changhua Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 38 days.

(21) Appl. No.: 10/145,039

(22) Filed: May 15, 2002

(65) Prior Publication Data

US 2003/0150303 A1 Aug. 14, 2003

(30) Foreign Application Priority Data

Feb. 8, 2002 (TW) ........................................ 91201594 U

(51) Int. Cl.⁷ ............................ B23B 19/02; B23C 7/00
(52) U.S. Cl. ............................ 82/147; 82/142; 409/231
(58) Field of Search ........................... 82/117, 121, 142, 82/147, 149; 409/231, 233

(56) References Cited

U.S. PATENT DOCUMENTS

| | | | | |
|---|---|---|---|---|
| 4,665,781 A | * | 5/1987 | Eichenhofer et al. | ......... 82/129 |
| 6,174,115 B1 | * | 1/2001 | Hashidate et al. | ......... 409/231 |
| 6,357,565 B1 | * | 3/2002 | Bolledi et al. | ............ 188/371 |
| 6,554,551 B1 | * | 4/2003 | Marelli | ....................... 409/201 |

* cited by examiner

Primary Examiner—A. L. Wellington
Assistant Examiner—Brian D. Walsh
(74) Attorney, Agent, or Firm—Rabin & Berdo, P.C.

(57) ABSTRACT

Disclosed herein is means for directly coupling a main motor shaft to a working machine with a coupling head as an intermediate component. The machine unit assembled according to the present invention does not require rechecking of dimensional deviations after completion of assembly. The present invention is applicable to both upright type and lateral type machine units.

10 Claims, 4 Drawing Sheets

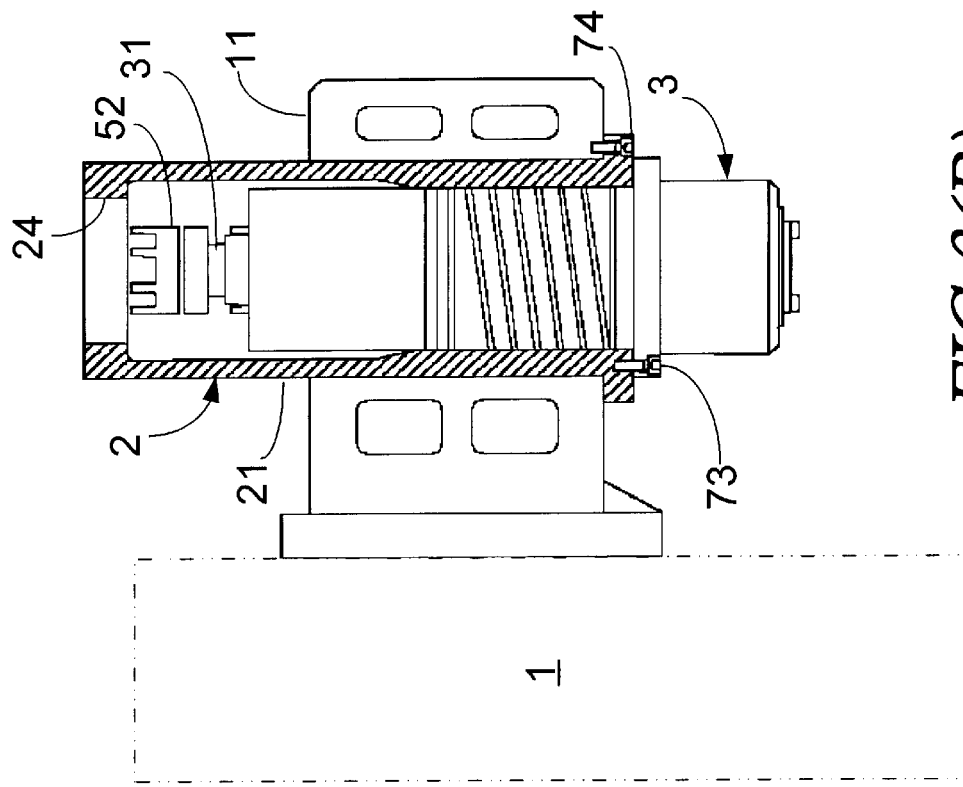
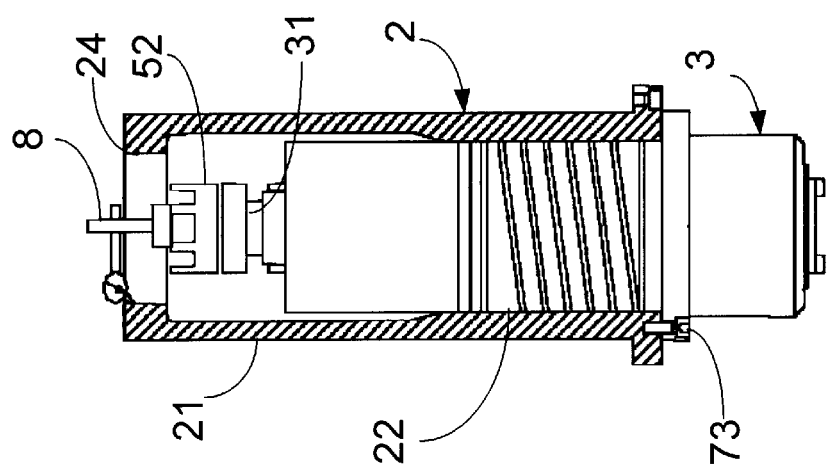
FIG.3(A)
FIG.3(B)

MEANS FOR DIRECTLY COUPLING MAIN MOTOR SHAFT TO WORKING MACHINE

BACKGROUND OF THE INVENTION

1. Field of the invention

The present invention relates to means for directly coupling a main motor shaft to a working machine, and more particularly, means for directly coupling the shaft of a main driving motor to that of a working machine on the same machine base.

2. Description of the Prior Art

FIG. 1 is a schematic view showing a conventional scheme of a main motor shaft directly coupled to a working machine wherein a main motor 91 drives a direct coupling shaft 93 by a shaft coupling 92. As it is shown in FIG. 1, the main motor 91 is fixedly mounted on the headstock 95 of a working machine 94. With such a layout, the geometrical accuracy of positional relation among the main motor 91, direct coupling shaft 93, and the headstock 95 of the working machine 94 has to rely on a worker's precision aligning skill. However, it requires a much labor and high production costs to attain the necessary assembly accuracy for the machine to work without too loud of a noise or severe vibration. Besides, there are other problems such as strenuous regular maintenance and expensive repair work. In order to palliate the above described existing shortcomings, the present inventor has delved into this matter for a long time, and after repeated efforts of research, simulations and experiments, finally has come to a realization of the present invention.

SUMMARY OF THE INVENTION

It is an object of the present invention to provide means for directly coupling a main motor shaft to a working machine so that the previous shortcomings, such as relying on skilled workers for precision alignment, high production costs, and wasted labor time for assembly can be eliminated, therefore improving marketability.

It is another object of the present invention to provide means for directly coupling a main motor shaft to a working machine so that too loud machine noise and severe machine vibration can be alleviated.

To achieve the above mentioned objects, means for directly coupling a main motor shaft to a working machine according to the present invention comprises: employing a machine headstock having an installation cavity; a coupling head formed of a hollow body which can be sleeved into the installation cavity of the headstock along the outer edges of the hollow body; a spindle housing inserted into the coupling head along the head's inner edges; a main motor for supplying driving power; and a shaft coupling for coupling the main motor with a rotating shaft of the spindle housing such that the driving power of the main motor can be transmitted to the rotating shaft via the shaft coupling. For assembling the aforementioned components, such as the coupling head to the headstock, the spindle housing to the coupling head, the main motor to an main motor interconnecting plate, and the interconnecting plate to the coupling head, screw engagement is employed in all cases. Meanwhile, the above mentioned interconnecting plate is interposed between the coupling head and the main motor.

BRIEF DESCRIPTION OF THE DRAWINGS

The above objects and other advantages of the present invention will become more apparent by describing in detail the preferred embodiment of the present invention with reference to the attached drawings in which:

FIGS. 3(A) and 3(B) are view illustrating how the main motor shaft is coupled with the working machine according to the present invention.

DETAILED DESCRIPTION OF THE PREFERRED EMBODIMENT

Figure 1:
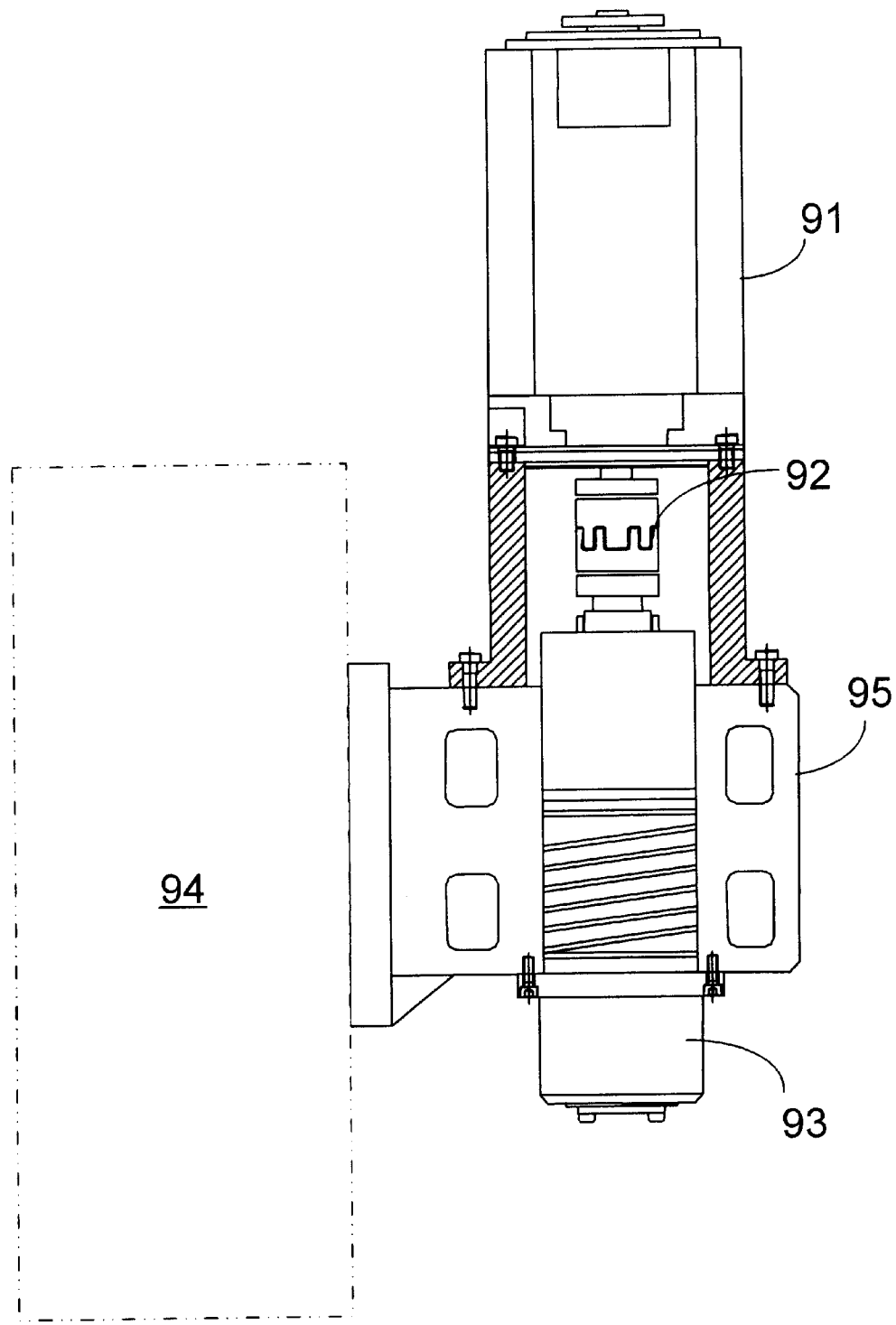
FIG. 1 is a schematic view showing a conventional scheme of a main motor shaft directly coupled to a working machine.
Figure 2:
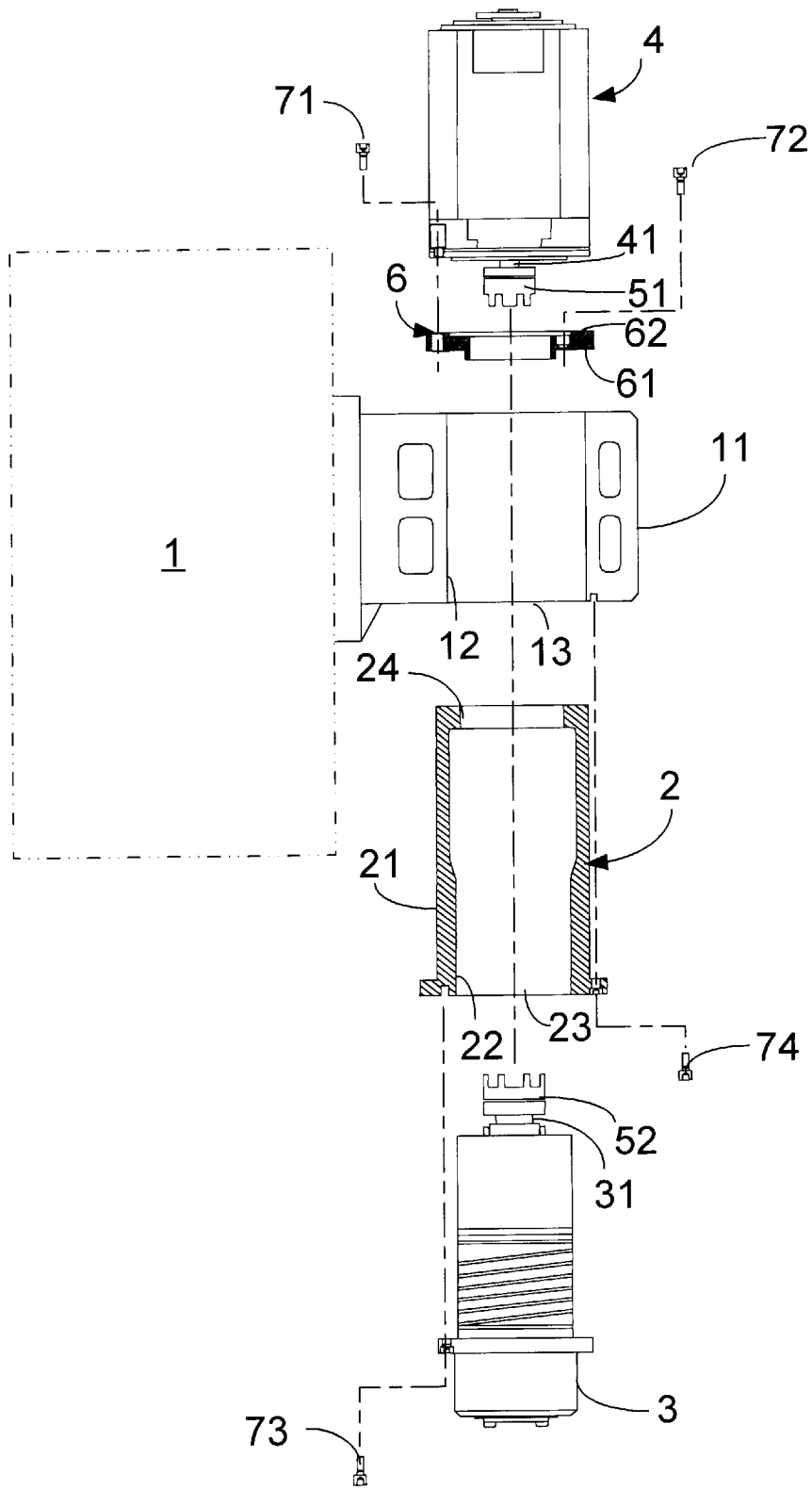
FIG. 2 is a longitudinal cross sectional view for illustrating means for directly coupling a main motor shaft to a working machine according to the present invention.
Figure 4:
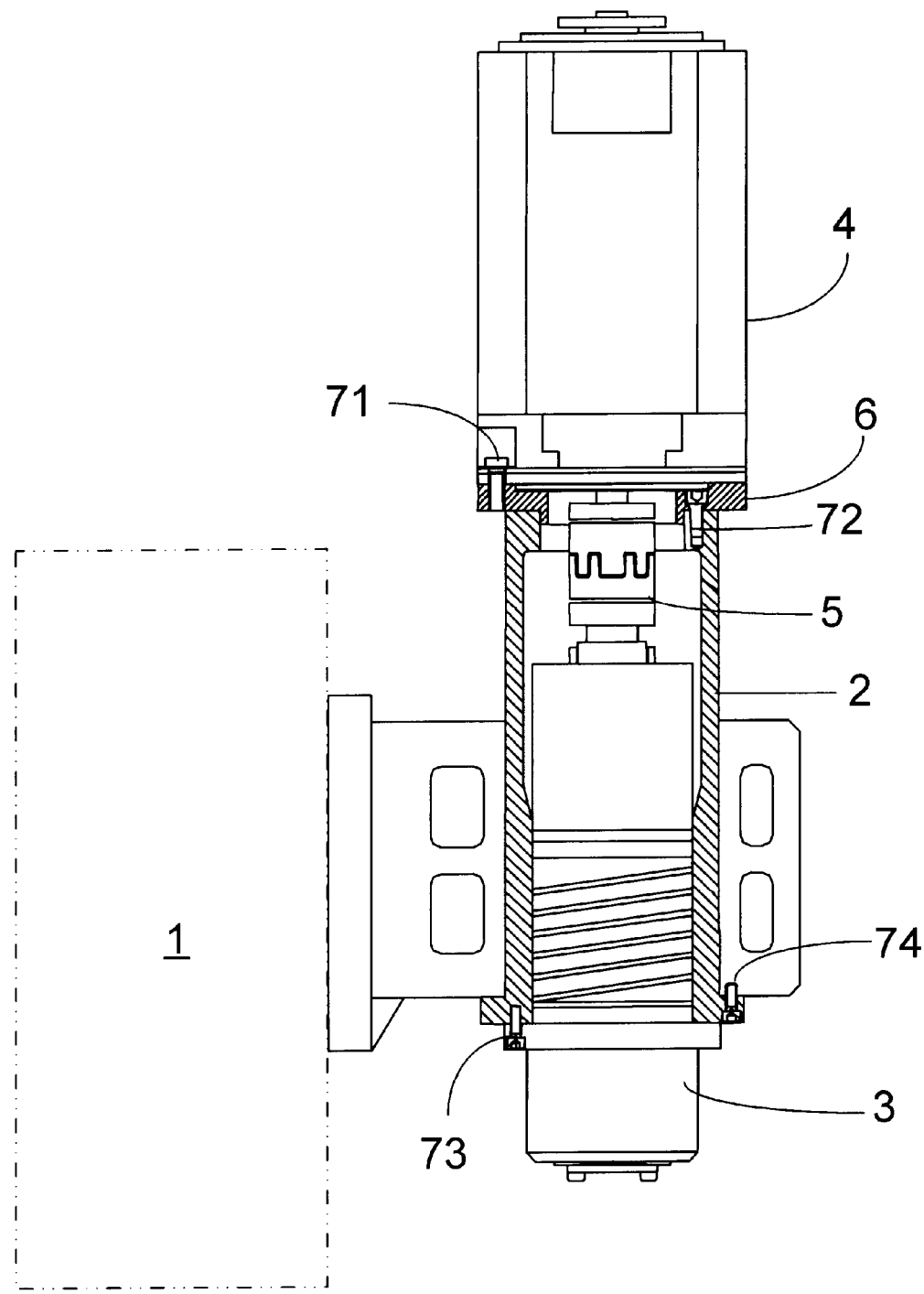
FIG. 4 is a cross sectional view of an assembled direct coupling main motor and working machine according to the present invention.

Referring to FIG. 2, a working machine 1, a coupling head 2, a spindle housing 3, a main motor 4, a shaft coupling 5(see FIG. 4 for detail) and a main motor interconnecting plate 6 are assembled to form a directly coupled motor and working machine unit. Further to this, the working machine 1 includes a machine headstock 11 with an installation cavity 12. The coupling head 2 is formed of a hollow body which can be sleeved into the installation cavity 12 of the headstock 11 along the outer edges 21 of the hollow body. The spindle housing 3 is inserted into the coupling head 2 along the inner edges of the coupling head 2. The main motor 4 supplies driving power to the working machine 1. The shaft coupling 5 is employed to couple a rotatable shaft 31 of the spindle housing 3 with a rotating shaft 41 of the main motor 4 such that the main motor 4 may drive the shaft 31 to rotate. The interconnecting plate 6 is interposed between the coupling head 2 and the main motor 4 and interconnects the above two components with screws 72 and 71 respectively.

Referring to FIGS. 2, 3(A), 3(B) and 4 simultaneously, the direct coupling motor and working machine unit is assembled by means of the present invention in the way that first, the shaft coupling 5 is provided as two parts, a main motor shaft side 51, and a machine shaft side 52. Then, the shaft coupling 5 is fixed appropriately in the accurate position after the main motor shaft side 51 has been mated to the rotating shaft 41 of the main motor 4. On the other hand, the machine shaft side 52 is sleeved into the rotating shaft 31 of the spindle housing 3 and appropriately fixed thereat. Then, the bottom portion 23 of the coupling head 2 is sleeved into the machine shaft side 52 of the shaft coupling 5 to which the spindle housing 3 is attached. Then a gauge 8 is set on the rotating shaft 31 of the spindle housing 3 so as to check if the positional deviation of the coupling head 2 in its inner cavity 24 is allowable. When it is considered to be allowable, the spindle housing 3 is directly coupled to the coupling head 2 with screws 73. After that, the coupling head 2 together with its screw engaged spindle housing 3 is inserted into the installation cavity 12 from the bottom portion 13 of the machine headstock 11 of the working machine 1 and engaged with the headstock 11 with screws 74. Then, by applying a precision machining technique, the accuracy of parallelism is adjusted between two contact surface planes 61 (contacting the coupling head 2) and 62 (contacting the main motor 4) of the interconnecting plate 6 in a range within 2 um, and the clearance between the coupling head 2 and the main motor 4 is controlled, and the positional deviation of the inner cavity 24 of the coupling head 2 is controlled to a minor possible value. After that, the main motor 4 can be screwed onto the interconnecting plate 6 with screws 71, and the interconnecting plate 6 can be screwed onto the coupling head 2 with screws 72. The assembly quality of the main motor 4, the interconnecting plate 6 and the coupling head 2 does not need to be rechecked before operation of the working machine 1. Finally, the assembly work for the whole unit is completed by connecting the main motor shaft side 51 and the machine shaft side 52 of the shaft coupling 5. Incidentally, the present invention is applicable to both upright and lateral machines.

It is understood from the description of the above embodiment that the invention has several note worthy advantages, in particular:

1. The present invention provides means for directly coupling main motor shaft to a working machine without a need for skillful workers for precision alignment, requirement for high production cost, and wasting long time labor of assembly so as to improve marketability.
2. According to the present invention, excessive machine noise and severe machine vibration can be alleviated.

Although the invention has been described in terms of a preferred embodiment, it is apparent that numerous variations and modifications may be made without departing from the true spirit and scope thereof as set forth in the following claims.

What is claimed is:

1. A method of directly coupling a main motor shaft to a working machines comprising:
    providing a machine headstock having an installation cavity;
    providing a coupling head having a hollow body, and inserting the hollow body into the installation cavity of the machine headstock, so that the machine headstock is sleeved around the hollow body;
    inserting a spindle housing into the hollow body of the coupling head;
    providing a main motor for supplying machine driving power;
    coupling the main motor with a rotatable shaft of the spindle housing using a shaft coupling, such that the machine driving power of the main motor is transmitted to the rotatable shaft via the shaft coupling;
    screwing and engaging the main motor to a main motor interconnecting plate; and
    screwing and engaging the main motor interconnecting plate to the coupling head.

2. A method of directly coupling a main motor shaft to a working machine, as recited in claim 1, wherein the working machine is one of an upright type and a lateral type.

3. A method of directly coupling a main motor shaft to a working machine, as recited in claim 1, further comprising screwing and engaging the coupling head to the machine headstock.

4. A method of directly coupling a main motor shaft to a working machine, as recited in claim 1, further comprising screwing and engaging the spindle housing to the coupling head.

5. A method of directly coupling a main motor shaft to a working machine, as recited in claim 1, further comprising fixedly installing the hollow body of the coupling head in the installation cavity of the machine headstock after the spindle housing is inserted into the hollow body of the coupling head.

6. A method of directly coupling a main motor shaft to a working machine, as recited in claim 1, further comprising interposing the main motor interconnecting plate between the coupling head and the main motor.

7. A motor and working machine unit, comprising:
    a machine headstock having an installation cavity;
    a coupling head having a hollow body, the hollow body being inserted into the installation cavity of the machine headstock, so that the machine headstock is sleeved around the hollow body;
    a spindle housing inserted into the hollow body of the coupling head, the spindle housing having a rotatable shaft;
    a main motor that supplies machine driving power;
    a shaft coupling that couples the main motor with the rotatable shaft of the spindle housing, such that the machine driving power of the main motor is transmitted to the rotatable shaft via the shaft coupling; and
    a main motor interconnecting plate screwed and engaged to both the main motor and the coupling head.

8. The motor and working machine unit, as recited in claim 7, wherein the coupling head is screwed and engaged to the machine headstock.

9. The motor and working machine unit, as recited in claim 7, wherein the spindle housing is screwed and engaged to the coupling head.

10. The motor and working machine unit, as recited in claim 7, wherein the main motor interconnecting plate is interposed between the coupling head and the main motor.

* * * * *